June 1, 1937.　　　G. A. KENDALL　　　2,082,292
BRAKE COMBINATION FOR DUAL TRAILER WHEELS AND WHEEL CONSTRUCTION Filed Jan. 9, 1933　　　2 Sheets-Sheet 1

INVENTOR
George A. Kendall.
BY
Harness, Dickey, Pierce & Hann.
ATTORNEYS.

June 1, 1937.  G. A. KENDALL  2,082,292
BRAKE COMBINATION FOR DUAL TRAILER WHEELS AND WHEEL CONSTRUCTION
Filed Jan. 9, 1933  2 Sheets-Sheet 2
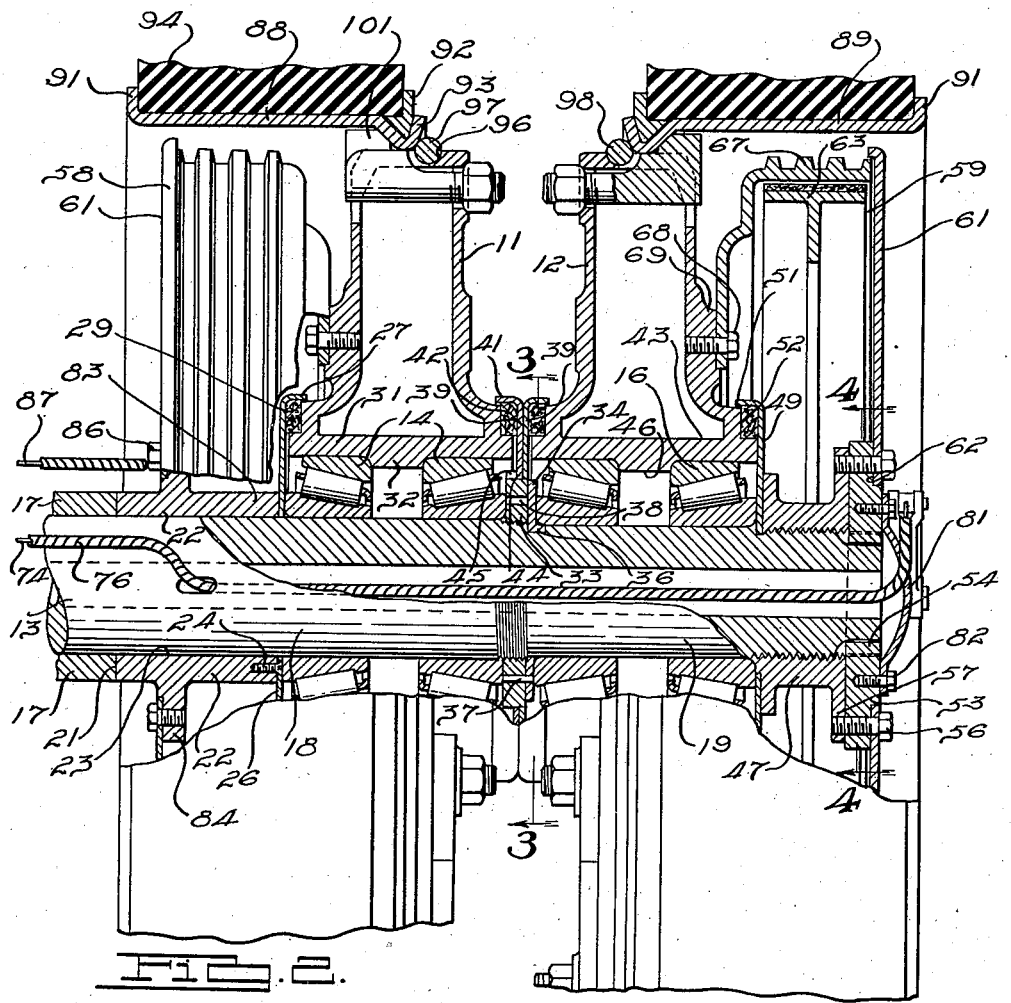
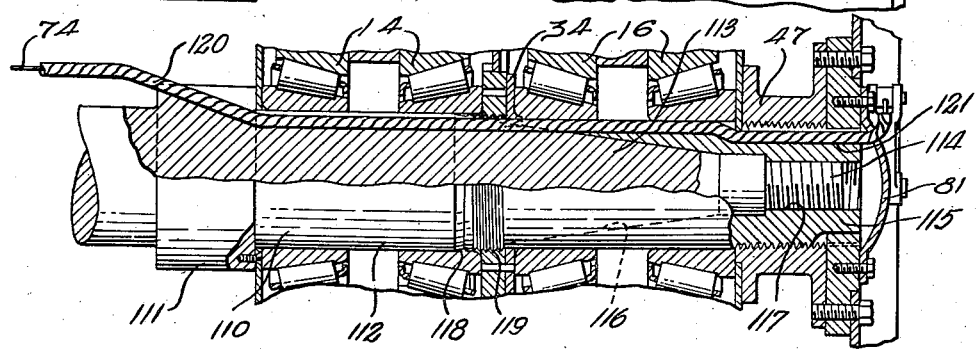
INVENTOR
*George A. Kendall.*
BY
*Harness, Dickey, Pierce & Hann.*
ATTORNEYS.

Patented June 1, 1937

2,082,292

UNITED STATES PATENT OFFICE 2,082,292

BRAKE COMBINATION FOR DUAL TRAILER WHEELS AND WHEEL CONSTRUCTION

George A. Kendall, Windsor, Ontario, Canada

Application January 9, 1933, Serial No. 650,821

4 Claims. (Cl. 188—2)

This invention relates to wheels for motor or other vehicles and has particular relation to wheels suitable for employment in dual or other relation, upon trailers pulled by other power propelled vehicles.

An object of the invention is to provide wheels mounted upon an axle, in dual relation and in such manner that either of the wheels can be removed without affecting operation of the other, thereby rendering it possible to operate a vehicle at least during emergencies when one of the wheels is incapable of use.

Another object of the invention is to provide independently operable brakes for dual or other multiple wheels employed in side-by-side relation upon an axle spindle.

Another object of the invention is to provide a novel means for clamping rims upon the wheels of motor vehicles generally, and particularly upon motor vehicles having dual wheels where one of the rims must be removed over a wheel employed in supporting the other rim.

Another object of the invention is to provide a ring for employment in holding rims upon and supporting the wheels of motor or other vehicles, which is held in position by tension.

Another object of the invention is to provide means for retaining the lubricant employed in wheels of motor vehicles inside the hubs of the wheels to prevent its escape into the brake bands or other mechanism mounted adjacent thereto.

Another object of the invention is to provide a novel means for supporting and locking dual wheels upon the axle spindles employed in motor vehicles.

Another object of the invention is to provide an arrangement for and process of converting a single wheel supporting axle into a dual wheel supporting axle or vice-versa.

Other objects of the invention will become apparent from the following description and from the claims hereinafter set forth.

For a better understanding of the invention, references may be had to the accompanying drawings, illustrating a particular form of the invention, wherein:

Fig. 2 is a vertical sectional view of the wheel and the axle spindle, taken substantially on line 2—2 of Fig. 1.

Fig. 6 is a fragmentary cross-sectional view similar to Fig. 2, illustrating the manner of converting a single wheel supporting axle into a dual wheel supporting axle, and vice-versa.

Figure 1:
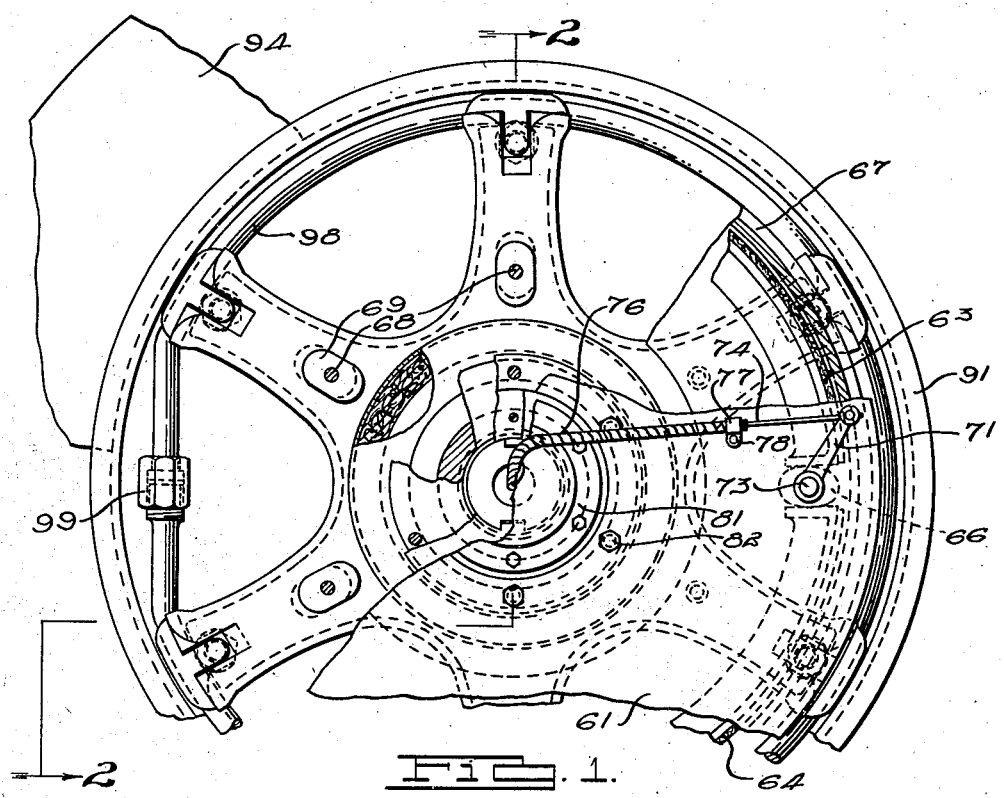
Figure 1 is a fragmentary side elevational view of an arrangement constructed according to one form of the invention and with certain parts of the structure broken away in order to better illustrate certain parts.
Figure 5:
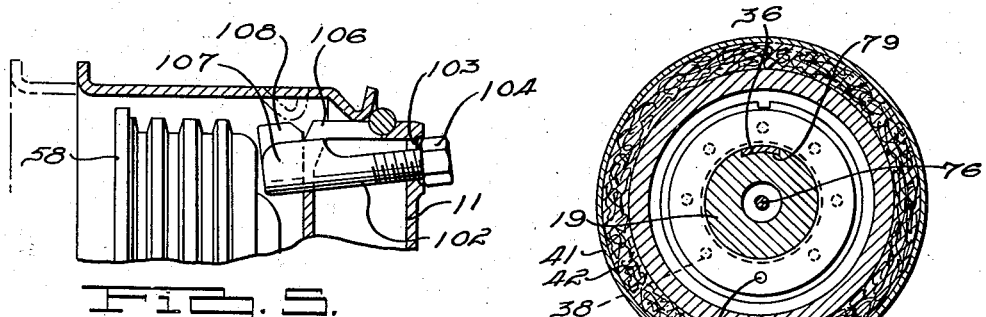
Fig. 5 is a fragmentary and enlarged sectional view of one of the wheels, illustrating the manner in which a rim is attached and removed.
Figure 3:
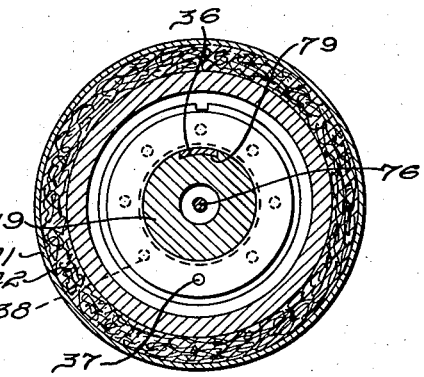
Fig. 3 is a cross-sectional view taken in a region between the dual wheels and substantially in the plane of line 3—3 of Fig. 2.
Figure 4:
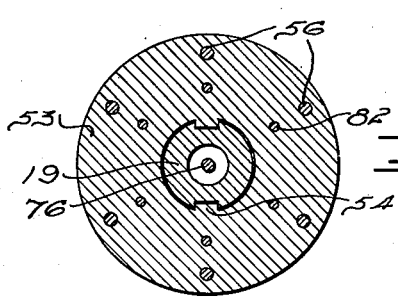
Fig. 4 is a view similar to Fig. 3 except that the latter is taken in a region adjacent the axially outer end of the axle spindle and substantially in the plane of line 4—4 of Fig. 2.

Referring more particularly to the drawings and Fig. 2 thereof, a pair of substantially identical inboard and outboard wheels 11 and 12 are illustrated, which in the present instance are mounted rotatably upon an axle spindle 13 by the employment of oppositely disposed pairs of roller bearings 14 and 16 respectively. In the present instance the wheels 11 and 12 are of the hollow cast metal spoke and felloeless type and are substantially identical in construction except for their disposition upon the spindle 13 in opposite relation. It is to be understood, however, that these wheels are employed merely for the purpose of illustration and that other desirable types of wheels may be employed.

The spindle 13, which extends from an axle 17 of somewhat greater diameter, is formed to provide an inner section 18 and a slightly smaller outer section 19. Against a shoulder 21 formed at the axially outer extremity of the axle 17, a collar 22 is provided, which is secured by a key 23, in non-rotative relation upon the spindle section 18 and against the axially outer end of the collar a screw 24 retains a lubricant retaining cap 26 thereto. The cap at its radially outer edge is provided with a flange 27 which slidably engages and retains a felt or other suitable washer 29 in a recessed portion of the hub 31 of the wheel 11. On the radially inner surface of the hub 31, and midway between the opposite ends thereof, an annular radial projection 32 is formed by means of which the axially inner one of the bearings 14 is secured firmly against the radially inner portion of the cap 26 which in turn is held against the end of the sleeve 22. The outer one of the bearings 14 is held against the shoulder 32 by means of an internally threaded annular ring 33 which is adapted to be tightened upon the threaded outer end of the inner section 18 of the spindle 13. This ring is held in position upon the spindle by a locking ring 34 having a tongue 36 disposed in an axial slot formed in the spindle adjacent the axially outer end of the threaded portion, and this slot may extend partly into the latter.

The locking ring 34 is somewhat larger in internal diameter than the outer portion 19 of the ring over portion 19 with the tongue 36 sliding over such portion 19 on the spindle without providing a slot throughout the entire extent of the latter. The locking ring then may be moved radially until the tongue is in the slot and be held in position to prevent movement of the retaining ring 33 in any suitable manner, for example, by employment of a dowel pin or screw 37 adapted to project through an opening formed in the locking ring 34 and into any one of a plurality of openings 38 formed around the retaining ring 33 in spaced relation. Thus the ring 33 may be adapted, and then locked to ring 34 by disposing the dowel pin or set screw into a corresponding opening 38.

On the outer surface of the retaining ring 33 a pair of lubricant retaining caps 39 are provided having flanges 41 projecting in opposite directions and within each of which a felt annular lubricant retaining ring 42 is secured. The ring 42 in the axially inner cap engages a portion of the outer extremity of the hub 31 of the wheel 11 while the ring 42 in the axially outer cap engages a corresponding portion of the hub 43 of the outer wheel 12. Each of these caps is secured in non-rotative relation upon the retaining ring 33 by an inwardly projecting lug 44 engaging a longitudinally disposed slot 45 formed in the outer surface of the retaining ring.

The inner surface of the hub 43 likewise is provided with an inwardly disposed annular projection 46 which engages the axially inner one of the bearings 16 employed in supporting the wheel 12 and retains such bearing in operative position against the outer surface of the locking ring 34. The axially outer one of the bearings 16 is held in position against the annular projection 46 by a flanged nut 47 which is threaded upon the axially outer end of the spindle section 19. Between this bearing and the nut 47, however, a lubricant-retaining cap 49 is disposed, having at its radially outer edge, a flange 51 directed axially inwardly, which retains a felt ring 52 against an outer portion of the hub 43.

The nut 47 is adjustably held in position upon the spindle 13 by a locking ring 53 which is splined upon the axially outer extremity of the spindle as is indicated at 54. The locking ring 53 is provided with any desired number of cap screws 56 which extend into threaded openings 57 formed in the flanged portion of the nut 47. The cap screws 56 prevent relative rotation between the locking ring 53 and the nut 47 by which the latter is secured non-rotatively in any desired position upon the spindle 13.

The wheels 11 and 12 are provided with brakes 58 and 59 respectively which may be of any desired type. The brake 59 employed on the outer wheel 12 comprises a stationary plate 61 which may be secured rigidly to the outer end of the spindle 13 in any desired manner as, for example, within an annular recess 62 formed in the locking ring 53 and by the employment of the bolts or cap screws 56 already mentioned. This plate has a pair of brake shoes 63 and 64 which may be pivotally secured at one end to the plate and which are adapted to be expanded at their other ends by a cam 66 secured rotatively to the plate 61 in a region immediately between the movable extremities of the shoes. The outer surfaces of the shoes 63 and 64 are adapted to engage the inner surface of a brake drum 67 which is secured by bolts 68 Fig. 2 against pads 69 formed on the spokes of the wheel 12.

The operation of the shoes is controlled by a lever 71 disposed outside the plate 61 and secured rigidly to a stud 73 on which the cam 66 is rotatively mounted. A Bowden wire 74, for example, may be secured at one end to the outer end of the arm 71 and have a flexible sheath 76, the end of which is secured by a bracket 77 and screws 78 to the plate 61. This wire and its sheath may extend through the hollow axle spindle 13 and then through the wall of the latter to the inboard side of the inboard wheel where it is accessible for operating the brake. For protecting the end of the spindle from dirt, a cover 81 having an opening formed therein for receiving the Bowden wire, is secured rigidly to the locking ring 53 by means of bolts or cap screws 82.

For operatively supporting the brake 58 on the collar 22 an outwardly projecting flange 84 is provided on the latter, to which the brake plate 61 of the brake is secured by cap screws 86. In every other respect the brake 58 is substantially identical to the brake 59 and corresponding reference numerals are applied to each of the structures wherever applicable. The brake 58 like the brake 59, is operable by means of a Bowden wire 87 from any desired location. The two wires may be connected to the same brake operating mechanism for simultaneous manipulation or they may be operated independently.

On the outer ends of the spokes of the wheels 11 and 12 inboard and outboard rims 88 and 89 are supported respectively and these, like the wheels, are disposed in opposite relation. Each of the rims has an integral side flange 91 and a split removable ring 92, the latter being removably mounted in a grooved portion 93 at the side of the rim opposite the flange 91. The flange and the split ring retain a pneumatic or other suitable tire 94 on the rim.

For securing the rims upon the ends of the spokes, circumferential grooves 96 are provided in the ends of the spokes, in which wires 97 and 98 are disposed, which also support the spokes circumferentially. The grooves 96 formed in the wheel 11 are formed somewhat nearer the axially outer than to the inner edges of the spokes, whereas the grooves formed in the spokes of the wheel 12 are formed nearer the axially inner than the outer edges of the spokes. The rim 88 is disposed upon the ends of the spokes on the axially inner side of the ring 97 while the rim 89 is disposed upon the spokes of the wheel 12 on the axially outer side of ring 98.

In order to hold the wires 97 and 98 under tension within the grooves 96 at opposite ends of each wire, a tensioning device 99 which consists of a rotatable nut retained on one end of the wire by a flange, and which engages a threaded portion at the other end of the wire.

The rims 88 and 89 are held in position against the wires 97 and 98 by locking lugs 101 which are adapted to engage an axially tapered surface on the grooved portions while an oppositely tapered surface of the latter engages the wires 97 and 98.

Each of these lugs consists of a threaded stud portion 102 adapted to extend through openings 103 formed in the sides of the wheel spokes and there be engaged by nuts 104 for tightening or loosening the lugs. The openings 103 are formed in the spokes on the sides thereof adjacent the wires 97 and 98.

On the opposite sides of the spokes and partially across the outer ends thereof slots 106 are formed in which portions of the locking lugs 107 of generally rectangular cross section are adapted to be slidably and non-rotatably disposed. At this end of each of the locking lugs and at the outer edges thereof transversely disposed cam elements 108 are formed which are materially wider than the slots formed in the outer extremities of the wheel spokes and consequently they prevent the lugs from moving inwardly relative to the spokes when the nuts 104 are tightened to such an extent as to draw the elements across the outer ends of the spokes.

When the nuts are sufficiently loosened, however, these elements are adapted to slide radially and inwardly along the rear surfaces of the spokes until the outer extremities thereof are radially inward of the spoke ends. Thus, when the cam elements are in this retracted position the rims can be entirely removed from the wheels in one direction. When the nuts 104 are tightened sufficiently the cam elements 108 are tightened against the inwardly flanged portions of the rims and thus the latter are clamped between the cams and the rings 97 and 98.

When the entire structure is assembled as indicated in Fig. 2, the outer rim 89 may be removed from the wheel 12 by loosening the nuts 104 until the cam portions 108 of the locking lugs 107 may drop radially and inwardly behind the spokes, in which event the rim 89 can be moved off the ends of the spokes therebeyond. Should it then be desirable to take off the inner rim 88, this may be done merely by removing the wire 98 from the groove formed in the ends of the spokes of the wheel 12 and then removing the wire 97 from the spokes of the wheel 11. The wires 97 and 98 both can be removed merely by loosening the tensioning devices 99 employed in tightening them within the grooves.

Before removing the wire 97 the nuts 104 of the locking lugs of this wheel may be loosened slightly if desired in order to place the lugs in position for again replacing the rim. The nuts 104 do not have to be loosened in this instance enough to move the cam portions of the locking lugs off the ends of the spokes, but merely enough to permit the wire 97 to be tightened in the grooves in the ends of the spokes before the lugs are tightened against the rim.

It will be observed in this connection that either of the wheels 11 and 12 can be removed without affecting the operation of the other. This may be done by disconnecting the wheel desired to be removed and again assembling the structure so that the remaining wheel is placed in operative condition. Since the wheels are independently mounted, they will not necessarily run at the same speed and consequently a great saving in tires is made possible by the failure of one of the tires to slip when the vehicle turns a corner.

Since both of the wheels have independently operable brakes, the braking mechanism is not affected by the removal of one wheel, except by the absence of the brake involved, and either of the brakes can be adjusted or removed independently of the other. In the event a tire on one of the wheels should become punctured, the tire and rim may be removed without removing the wheel involved and the latter will remain stationary upon the spindle, or at least will not rotate at any great speed, while the other wheel carries the load previously carried by both wheels.

It should be observed that each wheel is provided with separate oil or lubricant-retaining means and consequently one wheel can be removed without the lubricant from the other escaping.

Referring to Fig. 6, a dual wheel arrangement is illustrated which is very similar to that described, except for the axle employed. In this case, the axle indicated at 110, may be of the conventional type employed for supporting a single wheel, and may have a radial flange 111, a cylindrical portion 112, and a tapered end 113 terminating in a threaded portion 114 for receiving a single wheel fastening nut. For converting this axle into an axle for receiving dual wheels, such as described previously, a tubular stub axle 115 may be employed, which has a tapered opening 116 for receiving the tapered portion 113 of the axle. Such stub axle may have a threaded opening 117 by means of which it may be threaded on the threaded portion 114 of the axle, and if a permanent arrangement is desired, the axially inner end of the stub axle may be welded to the axle, along the junction indicated at 118. This stub axle may have its axially inner end of larger diameter and threaded as indicated at 119, and the remainder of the stub axle may be substantially identical to the spindle section shown by Fig. 2 and cooperate with the same elements thereon in substantially the same way. However, owing to the fact that the single wheel axle 110 shown may not be tubular, it may be preferable to provide an axial groove 120 formed in the outer surface thereof, and a coinciding groove 121 formed in the stub axle, to accommodate the Bowden wire 74. The tongue 36 on the ring 34 may be bifurcated if preferred, to straddle the wire and groove 121 and disposed in a slot crossing the groove or the tongue may be disposed in a slot circumferentially spaced from the groove.

It will be appreciated in this construction that a single wheel axle may readily be converted into a dual wheel axle, thereby minimizing expense in a changeover from single to dual wheels. Moreover, the arrangement, at least where the stub axle is not welded to the primary axle, permits a reverse change from dual to single wheels.

While a preferred form of the invention is disclosed herein, it is to be understood that numerous other modified and equivalent structures are within the spirit of the invention as is defined by the appended claims.

I claim:

1. In combination, an axle, inboard and outboard wheels rotatably mounted on the axle, a brake for each wheel, and means accessible at the inboard side of the inboard wheel for operating the brakes and including means extending axially through a recess in the axle for operating the brake for the outboard wheel, said last means being operable through movement thereof axially of the axle.

2. In combination, an axle, inboard and outboard wheels rotatably mounted on the axle, separate brakes for the wheels and located at the remote sides thereof respectively, and means accessible at the inboard side of the inboard wheel for independently operating the brakes, said means including an element extending axially through a recess in the axle and which is operable by movement axially of the axle.

3. In combination, an axle, inboard and outboard wheels rotatably mounted on the axle, separate brake drums for the wheels, and located at the remote sides thereof, braking means mounted on the axle at said remote sides of the wheels and adapted to co-operate with the drums, and means at the inboard side of the inboard wheel and operatively connected to the braking means for actuating the latter, said actuating means including an element extending axially in a recess in the axle to the braking means at the outboard side of the outer wheel and being operable by movement axially of the axle.

4. In combination an axle, inboard and outboard wheels rotatably mounted on the axle, a brake for each wheel, and means accessible at the inboard side of the inboard wheel for operating both brakes, said means including an operable element projecting from the axle intermediate the ends thereof for operating the brake provided for the outboard wheel.

GEORGE A. KENDALL.